Feb. 19, 1935.  J. L. CREVELING  1,991,595
LUBRICATING DEVICE
Filed July 22, 1932
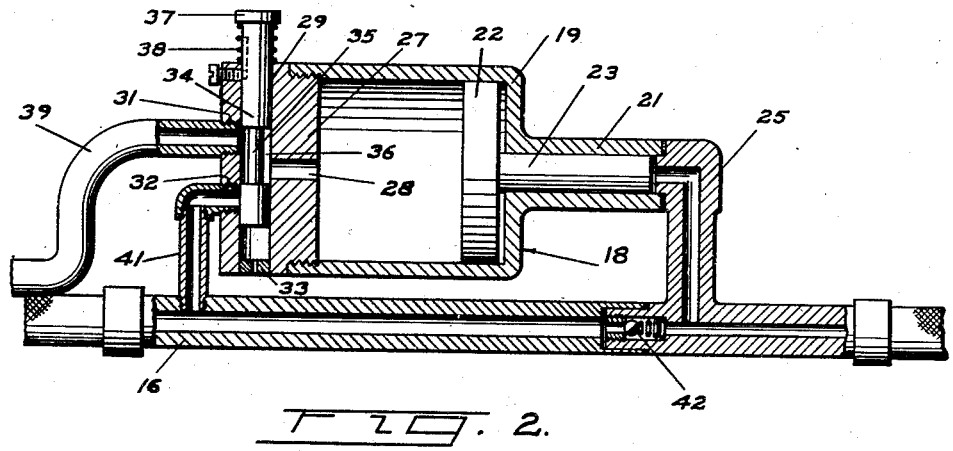
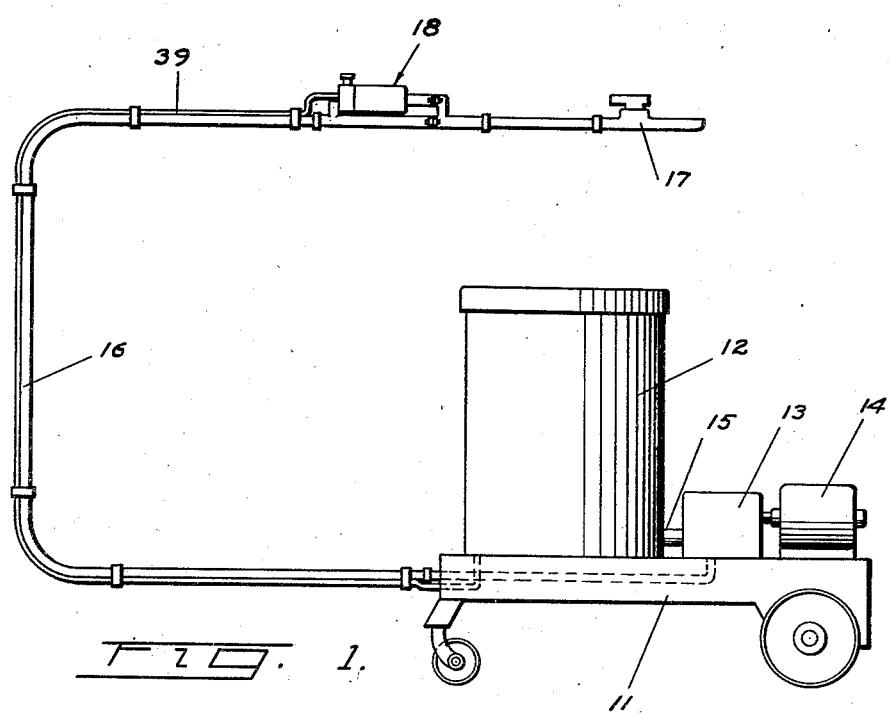
INVENTOR.
JOHN L. CREVELING
BY
ATTORNEY.

Patented Feb. 19, 1935

1,991,595

UNITED STATES PATENT OFFICE 1,991,595

LUBRICATING DEVICE

John L. Creveling, near Tucson, Ariz., assignor to The Lubrication Corporation, South Bend, Ind., a corporation of Delaware Application July 22, 1932, Serial No. 623,937

8 Claims. (Cl. 221—47.1)

This invention relates to lubrication devices and more particularly to "boosters" for developing higher pressures than may be developed by conventional means.

One of the objects of the invention is to provide new and improved means for forcing lubricant through lubrication fittings into bearings that are "frozen" or so packed with dirt and hardened lubricant that it is impossible to force lubricant thereinto by means of ordinary pressures.

A further object of the invention is to provide means for selectively making a pressure booster, of the type mentioned above, effective or ineffective.

A further object of the invention is to provide a pressure booster operated by lubricant pressure and, in combination therewith, efficient means for displacing the lubricant which is utilized to boost the pressure at the discharge.

A further object of the invention is to provide means for transferring operating lubricant from the booster after each boosting operation back to the lubricant reservoir or source of supply.

Further objects of the invention will be apparent after reading the subjoined specification and claims and after considering the accompanying drawing.

In the illustrated embodiment of my invention, a lubricant reservoir supplies lubricant to a pump which in turn forces the lubricant through a conduit to the nozzle and from the nozzle through lubrication fittings or nipples into the bearings. Associated with the conduit is a "booster" which comprises a pair of concentric cylinders of different diameters and a valve controlling the supply of lubricant to the larger cylinder.

Each of the cylinders carries a piston, the pistons being operatively connected. The smaller cylinder is connected by an outlet pipe with the discharge conduit and nozzle while a valve in the main supply line between the inlet to the booster and the booster outlet connection prevents dissipation of the boosted pressure in the main supply line. Thus when the valve is opened to allow lubricant to flow into the large cylinder, it acts to move both pistons and tends to exert a pressure upon the lubricant in the small cylinder which is very much greater than the normal line pressure being "boosted" by the ratio that the area of the large piston bears to the area of the small piston. Another lubricant line leads from the large cylinder back to the reservoir, bypassing the pump, the valve being so arranged that the large cylinder may be alternatively connected with the main conduit or with the return line leading directly to the lubricant reservoir.

In order to explain the invention more clearly, I have shown an embodiment thereof in the accompanying drawing in which:

Fig. 1 is a more or less diagrammatic view showing a lubrication servicing system including my invention; and Fig. 2 is a sectional view on a larger scale showing a portion of the main lubricant supply conduit, the booster and connections.

Referring in detail to the drawing, I have shown a truck 11 carrying a lubricant reservoir 12, a lubricant pump 13 and an electric motor 14 adapted to drive the lubrication pump 13. Connected to the pump 13 is a lubricant conduit 15 through which lubricant is drawn into the pump 13 from the reservoir 12. From the pump 13 the lubricant is normally forced through a main supply conduit 16 to a nozzle 17 from which it is delivered to lubrication fittings for bearings which are to be lubricated. Often in the operation of the system, this is all of the apparatus that is necessary.

However, should a "frozen'" bearing be encountered, the normal pressure developed by the pump 13 may be insufficient to force the lubricant through the associated fitting and into the bearing. Thereupon, it is necessary that the operator enlist the aid of some auxiliary device.

My invention provides an improved booster for developing greater pressure in the conduit 16 than would normally be possible by the operation of the pump 13. Secured to one side of the conduit 16 intermediate its ends is a booster generally designated 18 and comprising a cylinder 19 having a relatively large diameter and having formed concentric therewith a communicating cylinder 21 of relatively small diameter. Positioned in the cylinder 19 is a relatively large piston 22 having a cylindrical extension 23 which forms a piston for the small cylinder 21.

The small cylinder 21 may be detachably secured to a pipe 25 which may be integrally or otherwise secured to the conduit 16 so that lubricant may pass from the conduit 16 to the interior of the cylinder 21 and from said cylinder back to the conduit 16. The rear end of the cylinder 19 is closed by a plug 27 secured to said cylinder as by screw threads and provided with a concentric bore 28 extending from the forward end of the plug rearwardly approximately one half way through the plug; with a substantially right angled bore 29 extending through the plug and intersecting the bore 28; and with a pair of eccentric bores 31 and 32 parallel to the bore 28 and extending from the rear end of the plug to the bore 29. The bore 29 may be substantially closed at its lower end, if desired, but should have a vent as shown, and is provided with a cylindrical sliding valve 34 formed with a reduced portion 35 by means of which a shiftable annular chamber 36 is formed within the bore 29.

The valve member 34 is thus adapted, by means of the chamber 36, to establish communication between the bore 28 and the bore 32 or between the bore 28 and the bore 31. The valve member 34 is provided with a head 37, and interposed between the head 37 and the plug 27, is a spring 38 by which the valve is normally held in the position shown so that communication is established between the cylinder 19 and the bore 31.

Connected with the bore 31 is a flexible pipe 39 forming a lubricant line leading back to the reservoir 12. The pipe 39 may, if desired, lead back to the suction side of the pump 13. It may lead to the upper part of the reservoir 12 or may, as shown, lead to the lower part thereof. Connected with the bore 32 is a pipe 41 forming a lubrication line connected with the conduit 16. The connection between the pipe 41 and the conduit 16 is nearer the reservoir than the connection between the extension 23 and the conduit 16 and interposed between these two connections is a check valve 42 allowing passage of lubricant forwardly through the pipe 16 but preventing passage of lubricant rearwardly therethrough.

In the operation of my improved lubrication system, lubricant is supplied from the reservoir 12 by means of the pump 13 through the conduit 16 to the nozzle 17 and thus to the lubrication fitting which it is desired to service, unless a "frozen" fitting be encountered. When this occurs pressure in the conduit 16 in advance of the check valve 42 will cause lubricant to back up through the pipe 25 and force the piston 23 rearwardly thus expelling lubricant from the cylinder 19 which had been supplied thereto in a previous boosting operation. This lubricant is expelled from the cylinder 19 through the passageway 28, the chamber 36, the bore 31 and the lubricant line 39 back to the low pressure side of the reservoir 12.

As soon as the pistons 22 and 23 have been moved rearwardly, the operator presses on the head 37 of the valve 34 and thus closes communication between the cylinder 19 and the return line 39 and opens communication between the conduit 16 and the cylinder 19 through the line 41. Thus pressure delivered by the pump 13 acts upon the piston 22 and causes pressure to be built up in the cylinder 21 and in the conduit 16 in advance of the check valve 42, much greater than the normal pressure developed therein. The boosted pressure bears a ratio to the normal pressure corresponding to the ratio between the area of the large piston 22 and the area of the small piston 23. This increased pressure is sufficient to force lubricant into the "frozen" bearing and the bearing is thus lubricated. The operator then releases the valve 34 and the apparatus is again in the position shown in the drawing.

Normal lubrication of fittings is continued by the supply of lubricant through the conduit 16 to the nozzle 17 by means of the normal pressure developed by the pump 13 until another fitting hard to lubricate is encountered.

It is obvious that the piston 23 may be returned by overbalancing line pressure at any time during the normal operation of the control mechanism.

It is to be understood that the above described embodiments of the invention are for the purpose of illustration only and various changes may be made therein without departing from the spirit and scope of the appended claims.

I claim:

1. A lubricant supply system comprising, a lubricant reservoir, a pump connected to said reservoir, a conduit leading from said pump, a nozzle connected to said conduit, a check valve in said conduit, a booster associated with said conduit, a lubricant line connected to one end of said booster and to said conduit on the inlet side of said check valve, and a second lubricant line connected to the opposite end of said booster and to said conduit on the outlet side of said check valve.

2. A lubricant supply system, comprising, a lubricant reservoir, a pump associated with said reservoir, a lubricant conduit connected with said pump, a lubricant nozzle connected with said conduit, a lubricant pressure operated booster connected with said conduit, and a separate return lubricant line connected to the power cylinder of said booster and to said reservoir said booster being operated throughout its entire operating cycle by lubricant under pressure from said pump.

3. A lubricant supply system comprising, a lubricant reservoir, a pump associated with said reservoir, a lubricant conduit connected to said pump, a lubricant pressure operated booster associated with said conduit, a lubrication line separate from said conduit connected to the power cylinder of said booster and leading back to said reservoir, and a valve controlling the connection between said booster and said lubrication line said booster being operated throughout its entire operating cycle by lubricant under pressure from said pump.

4. A lubricant system comprising, a source of lubricant supply under relatively low pressure, pumping means for supplying lubricant from said source at relatively high pressure, a casing, a piston in said casing, a second casing having a substantially smaller cross sectional area than said first named casing, a piston in said second casing connected to said first named piston and having a substantially smaller cross sectional area than said first named piston, a connection between said source of lubricant supply and said first named casing, a connection between said source of lubricant supply, and said second named casing, and a separate connection between the lubricant pressure input side of said first named casing and the low pressure side of said source of lubricant supply.

5. A lubricating system comprising, a reservoir, a pump associated with said reservoir, a conduit connected to said pump, a booster associated with said conduit, said booster comprising a cylinder having a relatively large cross sectional area, a piston having a relatively large cross sectional area in said cylinder, a second cylinder having a relatively small cross sectional area and a second piston in said small cylinder having a relatively small cross sectional area and connected to said large piston, means for conducting fluid from said conduit to said large cylinder on the inner side of said large piston, means for conducting fluid from said conduit to the small cylinder on the outer side of said small piston, means for conducting fluid from the large cylinder directly from inner side of said large piston to said reservoir, and a valve for alternatively cutting communication between said conduit and said large cylinder or between said large cylinder and said reservoir.

6. A lubricant supply system comprising, a lubricant reservoir, a pump associated with said reservoir, a lubricant conduit connected to said pump, booster means including a lubricant operated power cylinder for automatically boosting the pressure in said lubricant conduit effective whenever excessive resistance is encountered and a return lubricant line leading directly from the pressure input side of said cylinder back to said reservoir.

7. A lubricant supply system comprising, a source of lubricant supply, a lubricant feed conduit, means for pumping lubricant from said supply source into said conduit at a predetermined pressure, a lubricant pressure booster including a piston assembly, means including a valve for admitting lubricant at said predetermined pressure to one end of said piston assembly to operate the booster through one-half of its operating cycle, and means effective when said valve is closed for causing the booster to operate through its remaining one-half cycle of operation under the influence of lubricant under said predetermined pressure applied to the opposite end of said piston assembly.

8. A lubricant supply system comprising, a source of lubricant supply, a lubricant feed conduit, means for pumping lubricant from said supply source into said conduit at a predetermined pressure, a lubricant pressure booster including a piston assembly, means including a valve for admitting lubricant at said predetermined pressure to one end of said piston assembly to operate the booster through one-half of its operating cycle, means effective when said valve is closed for causing the booster to operate through its remaining one-half cycle of operation under the influence of lubricant under said predetermined pressure applied to the opposite end of said piston assembly, and means operative to conduct lubricant employed to operate the booster during the first said one-half cycle of operation to said source of supply during the second half cycle booster operation.

JOHN L. CREVELING.